(12) United States Patent
Liu

(10) Patent No.: US 6,801,676 B1
(45) Date of Patent: Oct. 5, 2004

(54) METHOD AND APPARATUS FOR PHASE SHIFTING AN OPTICAL BEAM IN AN OPTICAL DEVICE WITH A BUFFER PLUG

(75) Inventor: Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/603,410

(22) Filed: Jun. 24, 2003

(51) Int. Cl.[7] .............................. G02F 1/35; G02B 6/10; G02B 5/14
(52) U.S. Cl. ...................... 385/3; 385/1; 385/2; 385/11; 385/12; 385/13; 385/14; 385/15; 385/16; 385/24; 385/56; 385/126; 385/131; 385/37; 359/237; 359/245; 359/248; 359/250; 359/252; 359/259; 359/279; 359/282; 359/333; 257/80; 257/84; 257/183; 257/458; 372/26; 372/40; 372/45; 372/91
(58) Field of Search ....................... 385/1–3, 37, 11–16, 385/24, 56, 126, 131; 359/237, 245, 248, 250, 252, 259, 279, 282, 333; 257/80, 84, 183, 458; 372/45, 91, 26, 40

(56) References Cited

U.S. PATENT DOCUMENTS

| | | | |
|---|---|---|---|
| 4,093,345 A | * 6/1978 | Logan et al. | .................... 385/2 |
| 4,923,264 A | 5/1990 | Langer et al. | |
| 5,007,062 A | * 4/1991 | Chesnoy | ....................... 372/26 |
| 5,388,106 A | * 2/1995 | Tabuchi | ........................ 372/20 |
| 5,661,825 A | 8/1997 | Van Dam et al. | |
| 5,838,844 A | 11/1998 | Van Dam et al. | |
| 5,933,554 A | 8/1999 | Leuthold et al. | |
| 6,052,498 A | 4/2000 | Paniccia | |
| 6,147,366 A | 11/2000 | Drottar et al. | |
| 6,222,963 B1 | 4/2001 | Grand et al. | |
| 6,393,169 B1 | 5/2002 | Paniccia et al. | |
| 6,434,289 B1 | 8/2002 | Paniccia et al. | |
| 6,600,842 B2 | * 7/2003 | Yamada | ......................... 385/2 |
| 2002/0051601 A1 | 5/2002 | Hung | |
| 2002/0071621 A1 | * 6/2002 | Yamada | ......................... 385/2 |
| 2002/0089711 A1 | 7/2002 | Conzone et al. | |
| 2002/0191886 A1 | 12/2002 | Castoldi et al. | |
| 2003/0002767 A1 | 1/2003 | Hanneman, Jr. | |

OTHER PUBLICATIONS

Tang et al., Electr. Lett. 31 (6), 1995, 451–452.*
Zhao et al., Electr. Lett. 32 (18), 1996, 1667–1668.*
Cutolo et al., J. Lightwave Technol. 15 (3), 1997, 505–518.*
Dainesi et al., IEEE Photonics Technol. Lett. 12 (6), 2000, 660–662.*
Nowak et al., Proc. 1994 IEEE Internat. SOI Conf., 94CH35722, pp. 42–43.*

* cited by examiner

*Primary Examiner*—John R. Lee
*Assistant Examiner*—Bernard Souw
(74) *Attorney, Agent, or Firm*—Blakely, Sokoloff, Taylor & Zafman LLP

(57) ABSTRACT

An apparatus and method for modulating a phase of optical beam with reduced contact loss. In one embodiment, an apparatus according to embodiments of the present invention includes a first region of an optical waveguide disposed in semiconductor material. The first region has a first conductivity type. The apparatus further includes a second region of the optical waveguide disposed in the semiconductor material. The second region has a second conductivity type, which is opposite to the first conductivity type. A first contact is coupled to the optical waveguide at a first location, which is outside an optical path of an optical beam that is to be directed through the optical waveguide. A first buffer of insulating material is disposed along the optical waveguide between the first contact and the optical path of the optical beam. A buffer plug of insulating material disposed in the optical waveguide on a same side as the first location. The buffer plug is to help direct a mode of the optical beam away from the first location.

30 Claims, 8 Drawing Sheets

METHOD AND APPARATUS FOR PHASE SHIFTING AN OPTICAL BEAM IN AN OPTICAL DEVICE WITH A BUFFER PLUG

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for phase shifting an optical beam with an optical device with reduced contact loss are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having a complementary metal oxide semiconductor (CMOS) capacitor structure, a p-n junction structure or a p-i-n structure, or the like, adapted to modulate a charge concentration along an optical path to phase shift an optical beam in response to a signal. In one embodiment, the charge modulation is to occur in an optical waveguide along an optical path through the optical waveguide. An optical beam is to be directed through the waveguide and through the charge modulated region to phase shift the optical beam. In one embodiment, optical loss due to overlap between the optical mode and a metal contact or a higher doped region is reduced with a buffer of insulating material disposed between the optical path of the optical beam and the metal contact. In one embodiment, a buffer plug is also included to help direct the mode of the optical beam away from the metal contact and/or the higher doped region to further reduce optical loss. Embodiments of the disclosed optical devices can be used in a variety of high bandwidth applications including multi-processor, telecommunications, networking as well as other high speed optical applications such as optical delay lines, switches, modulators, add/drops, or the like.

Figure 1:
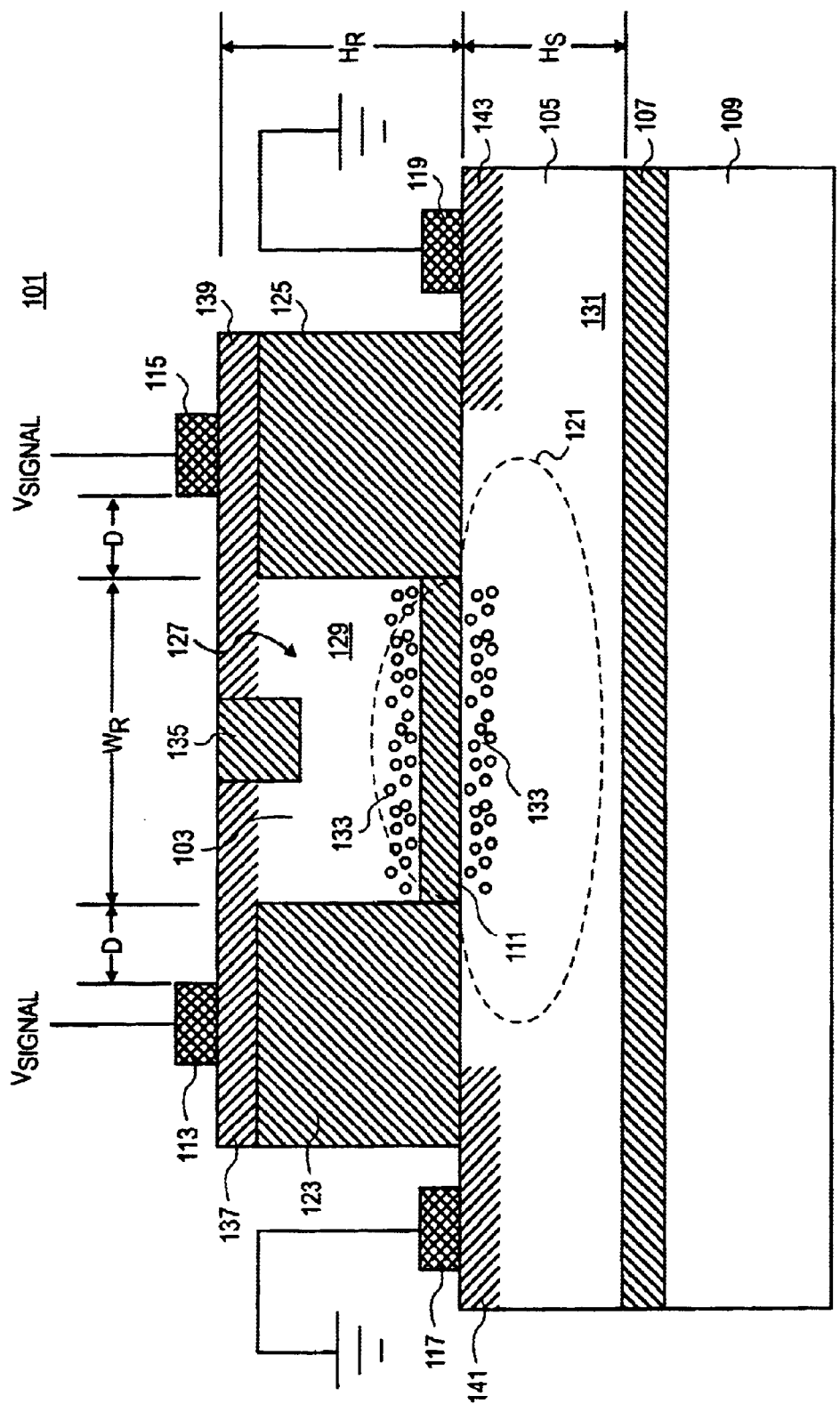
FIG. 1 is a cross-section illustration of one embodiment of an optical device including a buffer of insulating material disposed between a contact and an optical path as well as a buffer plug to help direct a mode of an optical beam away from the contact in accordance with the teachings of the present invention.

To illustrate, FIG. 1 is a cross-section illustrating generally one embodiment of an optical device including a buffer of insulating material disposed between a contact and an optical path of an optical beam as well as a buffer plug to help direct a mode of the optical beam away from the contact and/or a higher doped region in accordance with the teachings of the present invention. As shown in FIG. 1, optical device 101 includes a first region of semiconductor material 103 having a first conductivity type and a second region of semiconductor material 105 having a second conductivity type. In one embodiment, semiconductor material regions include silicon, polysilicon, or other suitable types of semiconductor material. In one embodiment, semiconductor material 103 also includes p-type dopants and semiconductor material 105 includes n-type dopants. It is appreciated that the polarities of the dopants are provided or explanation purposes and that the polarities of the dopants and corresponding voltages may be reversed in accordance with the teachings of the present invention.

In one embodiment, an optional insulating region 111 is disposed between semiconductor material regions 103 and 105. As illustrated in FIG. 1, one embodiment of optical device 101 is fabricated on a silicon-on-insulator (SOI) wafer and therefore includes a buried insulating layer 107 and a layer of semiconductor material 109. In an embodiment including insulating region 111 disposed between semiconductor material regions 103 and 105, a complementary metal oxide semiconductor (CMOS) capacitive structure is formed. As shown in FIG. 1, charge carriers in charge regions 133 are formed proximate to insulating region 111 in semiconductor material regions 103 and 105, which form the "plates" of a capacitor while the insulating region 111 provides the insulator between the "plates." In one embodiment, the concentration of charge carriers in charge regions 133 is modulated in response to VSIGNAL in accordance with the teachings of the present invention.

In another embodiment, optional insulating region 111 is not included. As such, a p-n junction is formed at the interface between semiconductor material regions 103 and 105. As mentioned in one embodiment above, semiconductor material 103 includes p-type dopants and semiconductor material 105 includes n-type dopants. Depending on how the p-n junction is biased, the concentration of charge carriers in charge regions 133 are modulated in response to $V_{SIGNAL}$ in accordance with the teachings of the present invention. For instance, in one embodiment, the p-n junction may be forward biased or reverse biased as desired in response to $V_{SIGNAL}$ to modulate the concentration of charge carriers in charge regions 133 in accordance with the teachings of the present invention. In another embodiment, it is appreciated that intrinsic material may be included to provide a p-i-n structure or the like in accordance with the teachings of the present invention.

In one embodiment, an optical waveguide 127 is included in optical device 101, through which an optical beam 121 is directed along an optical path. In the embodiment illustrated in FIG. 1, waveguide 127 is a rib waveguide including a rib region 129 and a slab region 131. In one embodiment, optical beam 121 includes infrared or near infrared light. For example, in one embodiment, optical beam 121 has a wavelength near approximately 1.3 $\mu$m or 1.55 $\mu$m. In the embodiment illustrated in FIG. 1, the optical path along which optical beam 121 is directed is along an axis that parallel to the axis of the optical waveguide of optical device 101. In the example shown in FIG. 1, the optical path and therefore optical-beam 121 are shown to propagate along a direction going through, or coming in and out of, the page.

As shown in the embodiment of FIG. 1, semiconductor material region 105 is grounded through contacts 117 and 119 and semiconductor material region 103 is coupled to receive $V_{SIGNAL}$ through contacts 113 and 115. In one embodiment, contacts 113, 115, 117 and 119 are metal contacts that are coupled to semiconductor material regions 103 and 105 at locations outside the optical path of optical beam 121.

In one embodiment, semiconductor material 103 includes a higher doped region 137 at the location at which metal contact 113 is coupled to semiconductor material 103. Similarly, semiconductor material 103 also includes a higher doped region 139 at the location at which metal contact 115 is coupled to semiconductor material 103. In one embodiment, semiconductor material 105 includes a higher doped region 141 at the location at which metal contact 117 is coupled to semiconductor material 105. Similarly, semiconductor material 105 also includes a higher doped region 143 at the location at which metal contact 119 is coupled to semiconductor material 105.

In an embodiment in which semiconductor material 103 includes- p-type dopants and semiconductor material 105 includes n-type dopants, higher doped regions 137 and 139 are heavily doped with p++type dopants and higher doped regions 141 and 143 are heavily doped with n++ type dopants. In one embodiment, higher doped regions may be made of semiconductor materials such as silicon, polysilicon, silicon germanium, or any other suitable type of semiconductor material. In one embodiment, the inclusion of higher doped regions 137, 139, 141 and 143 help improve the electrical coupling of metal contacts 113, 115, 117 and 119 to semiconductor material regions 103 and 105 in accordance with the teachings of the present invention. This improved electrical coupling reduces the contact resistance between metal contacts 13, 115, 117 and 119 and semiconductor material regions 103 and 105, which improves the electrical performance of optical device 101 in accordance with the teachings of the present invention.

The application of $V_{SIGNAL}$ to optical waveguide 127, as shown in FIG. 1, results in the modulation of free charge carriers in charge regions 133, which is proximate to insulating region 111 and through which optical beam 121 is directed. As can be appreciated to a person skilled in the art having the benefit of this disclosure, modulation of free charge carriers in charge regions 133 will also occur at the p-n junction between the semiconductor material regions 103 and 105 in the embodiment that does not include optional insulating region 111. In addition, depending on how the p-n junction structure is biased, current injection techniques may also be employed to modulate the free charge carrier concentration in the p-n junction structure. Furthermore, other suitable types of structures may be employed, such as for example p-i-n structures of the like in accordance with the teachings of the present invention to modulate the concentration of free charge carriers in charge regions 133 through which optical beam 121 is directed.

In one embodiment, a buffer of insulating material 123 and a buffer of insulating material 125 are also included in an optical device 101 in accordance with the teachings of the present invention. As shown in FIG. 1, buffer 123 is disposed between contact 113 and the optical path of optical beam 121. Buffer 125 is disposed between contact 115 and the optical path of optical beam 121. In one embodiment, buffers 123 and 125 are made of materials having lower refractive indexes than the refractive index of the core of waveguide 127. As a result, buffers 123 and 125 serve as cladding so as to help confine optical beam 121 to remain within waveguide 127. In the embodiment illustrated in FIG. 1, buried insulating layer 107 also serves as cladding so as to help confine optical beam 121 to remain within waveguide 127. In one embodiment, buffers 123 and 125 also serve as electrical isolators so as to electrically isolate the contacts coupled to waveguide 127 from the optical electric field guided from optical beam 121.

In one embodiment, a buffer plug 135 of insulating material is also disposed in optical waveguide 127. As shown in the example embodiment of FIG. 1, buffer plug 135 is disposed in optical waveguide 127 on the "top" side, which is the same side as the locations at which metal contacts 113 and 115 are electrically coupled to optical waveguide 127. In one embodiment, buffer plug 135 is made of a material having a lower refractive index than the refractive index of the core of waveguide 127. As a result, buffer plug 135 helps to direct the mode of optical beam 121 away from metal contacts 113 and 115 as well as higher doped regions 137 and 139 in accordance with the teachings of the present invention. In one embodiment, the width of buffer plug 135 is smaller than WR. In various embodiments, the height of buffer plug 135 can be equal to, less, or larger than the thickness of higher doped regions 137 and 139. Both width and height of buffer plug 135 can be properly varied in accordance with the teachings of the present invention.

In operation, optical beam 121 is directed through optical waveguide 127 along an optical path through charge regions 133. $V_{SIGNAL}$ is applied to optical waveguide 127 to modulate the free charge carrier concentration in charge regions 133 in semiconductor material 103 and 105. In the embodiment including insulating layer 111, the charge regions are proximate to insulating 111. In the embodiment without insulating layer 111, the charge regions 133 may be proximate to the interface between semiconductor material regions 103 and 105 or throughout the optical waveguide, depending on how the p-n junction is biased. The applied voltage from $V_{SIGNAL}$ changes the free charge carrier density in charge regions 133, which results in a change in the refractive index of the semiconductor material in optical waveguide 127.

In one embodiment, the free charge carriers in charge regions 133 may include for example electrons, holes or a combination thereof. In one embodiment, the free charge carriers may attenuate optical beam 121 when passing through. In particular, the free charge carriers in charge regions 133 may attenuate optical beam 121 by converting some of the energy of optical beam 121 into free charge carrier energy. Accordingly, the absence or presence of free charge carriers in charge regions 133 in response to in response to $V_{SIGNAL}$ will modulate optical beam 121 in accordance with the teachings of the present invention.

In one embodiment, the phase of optical beam 121 that passes through charge regions 133 is modulated in response to $V_{SIGNAL}$. In one embodiment, the phase of optical beam 121 passing through free charge carriers in charge regions 133, or the absence of free charge carriers, in optical waveguide 127 is modulated due to the plasma optical effect. The plasma optical effect arises due to an interaction between the optical electric field vector and free charge carriers that may be present along the optical path of the optical beam 121 in optical waveguide 127. The electric field of the optical beam 121 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 127 of optical device 101 is modulated in response to the modulation of free charge carriers charge regions 133. The modulated index of refraction in the waveguide of optical device 101 correspondingly modulates the phase of optical beam 121 propagating through optical waveguide 127 of optical device 101. In addition, the free charge carriers in charge regions 133 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \qquad \text{(Equation 1)}$$

with the optical wavelength $\lambda$, the refractive index change $\Delta n$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 2)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

In one embodiment, the dimensions of optical waveguide 127 are designed to accommodate a single mode for optical beam 121. For instance, in one embodiment, the width $W_R$ of the rib region 129 of optical waveguide 127 is approximately 2.5 $\mu$m, the height $H_R$ of the rib region 129 of optical waveguide 127 is approximately 0.9 $\mu$m and the height $H_S$ of the slab region 131 of optical waveguide 127 is approximately 1.5 $\mu$m. In one embodiment, the thickness of buffer regions 123 and 125 is approximately 0.5 to 0.8 $\mu$m and the thickness of the semiconductor material region 103 between contacts 113 and 115 and buffer regions 123 and 125 is approximately 0.2 to 0.3 $\mu$m. It is appreciated that these dimensions are provided for explanation purposes and that other dimensions may be utilized in accordance with the teachings of the present invention.

As illustrated in the example embodiment of FIG. 1, contacts 113 and 115 coupled to semiconductor material region 103 at locations offset a distance D from the edge of the rib region 129 of optical waveguide 127. In one embodiment, the amount of optical loss of optical beam 121 is related to the distance D between contacts 113 and 115 and the respective lateral edges of the rib region 129 of optical waveguide 127. Locating contacts 113 and 115 away from the mode optical beam 121, or outside the optical path of optical beam 121, reduces the optical loss due to metal contacts I 13 and 115 in accordance with the teachings of the present invention.

In one embodiment, it is noted that by reducing the distance D between contacts 113 and 115 and charge regions 133, the speed of optical device 101 may be increased due to the reduced resistor-capacitor (RC) time constant of the device. Furthermore, as stated previously, with the inclusion of higher doped regions 137 and 139, the electrical coupling between contacts 113 and 115 and optical waveguide 127 is further improved, which further reduces RC time constant of the optical device 101 in accordance with the teachings of the present invention.

Therefore, in one embodiment, metal contacts 113 and 115 may be located very close to the center of optical waveguide 127 in accordance with the teachings of the present invention with substantially little or no optical loss due to contacts 113 and 115 while the operating speed is still high. Indeed, it is appreciated that without buffers 123 and 125, a relatively high amount of optical loss may result due to an overlap between the optical mode of optical beam 121 and contacts 113 and/or 115.

In one embodiment, the inclusion of buffer plug 135 as shown in FIG. 1 even further reduces optical loss by helping direct the mode of optical beam 121 downward in FIG. 1 away from metal contacts 113 and 115 and/or higher doped regions 137 and 139, which helps to reduce, or even prevent, the guided optical field penetration of optical beam 121 in higher doped regions 137 and 139. Indeed, by directing the mode of optical beam 121 away from higher doped regions 137 and 139 as well as metal contacts 113 and 115, the significant optical absorption of optical beam 121 by the highly doped polysilicon of higher doped regions 137 and 139 is further reduced, or even prevented, in accordance with the teachings of the present invention.

Figure 2:
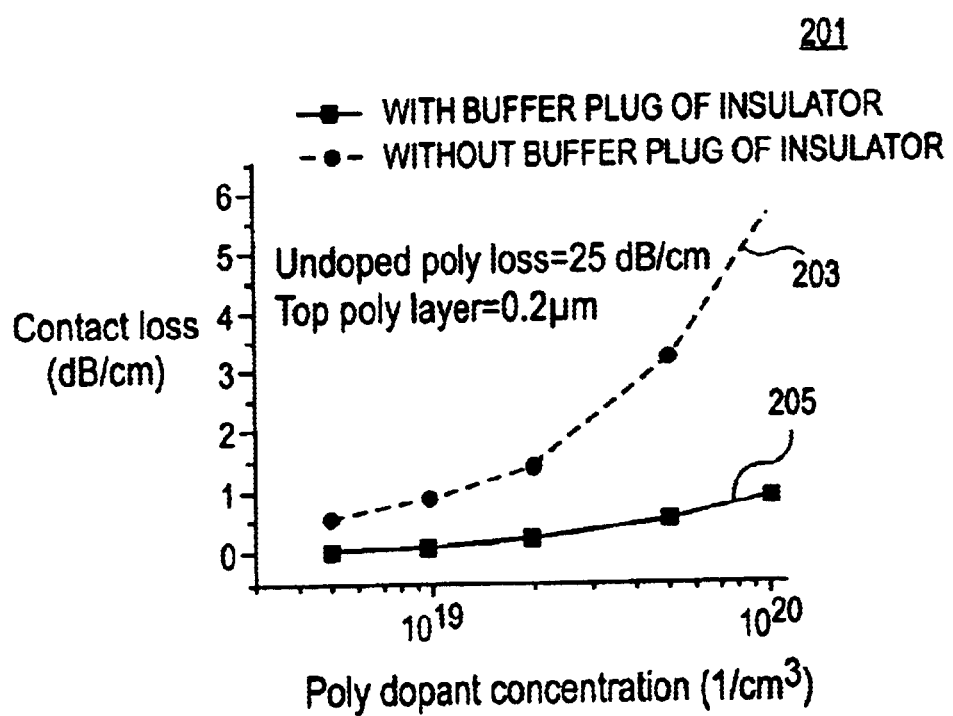
FIG. 2 is a plot illustrating a relationship between contact loss and dopant concentration of the higher doped regions according to one embodiment of an optical device in accordance with the teachings of the present invention.

To illustrate, FIG. 2 shows a diagram 201 illustrating the loss in according to one embodiment of an optical device in accordance with the teachings of the present invention. In the depicted embodiment, the higher doped regions 137 and 139 include polysilicon and have a thickness of 0.2 $\mu$m. In the illustrated embodiment, undoped polysilicon has a loss of 25 dB/cm. As shown in FIG. 2, plot 203 shows the relationship between contact loss and polysilicon dopant concentration for an embodiment of an optical device 101 without a buffer plug 135 of insulation. As mentioned above, as polysilicon dopant concentration increases, the RC time constant is reduced, which improves the performance of optical device 101. However, as shown with plot 203, contact loss increases significantly as the polysilicon dopant concentration increases. In contrast, plot 205 shows the relationship between contact loss and polysilicon dopant concentration for an embodiment of an optical device 101 that includes buffer plug 135 of insulation. As shown with plot 203, contact loss is reduced with buffer plug 135. Furthermore, contact loss does not increase nearly as significantly for increases in polysilicon dopant concentration when compared with plot 203.

Figure 3:
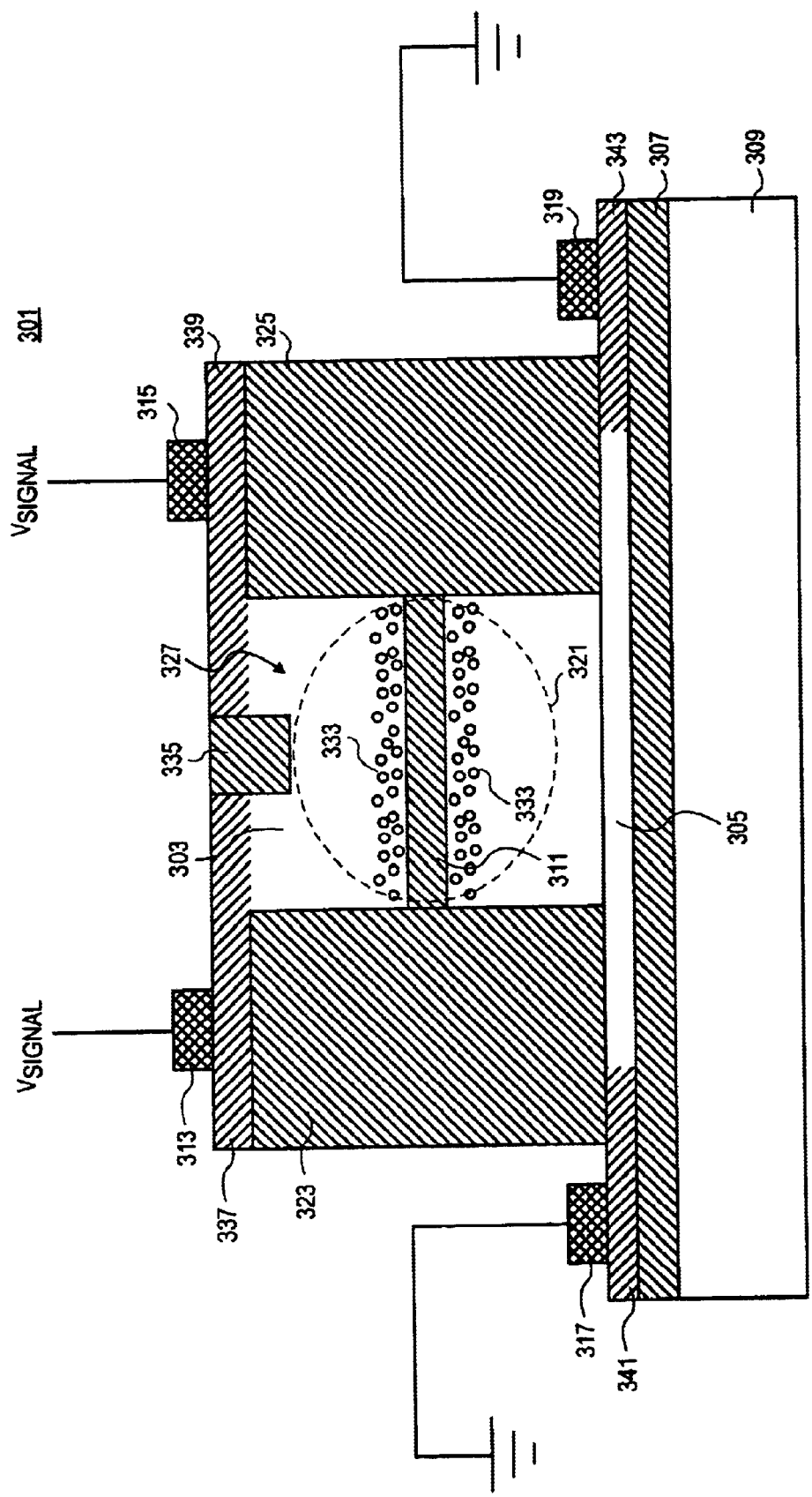
FIG. 3 is a cross-section illustration of another embodiment of an optical device including a buffer of insulating material disposed between a contact and an optical path as well as a buffer plug to help direct a mode of an optical beam away from the contact in accordance with the teachings of the present invention.

FIG. 3 is a cross-section illustration of another embodiment of an optical device 301 including a buffer of insulating material disposed between a contact and an optical path as well as a buffer plug to help direct an optical mode of an optical beam away from higher doped regions in accordance with the teachings of the present invention. Optical device 301 shares similarities with the previously described embodiments of optical devices of FIGS. 1 and 2 with an exception being that optical device 301 includes a strip waveguide 327 instead of a rib waveguide as illustrated in FIG. 1. In particular, optical device 301 includes a first region of semiconductor material 303 having a first conductivity type and a second region of semiconductor material 305 having a second conductivity type. In one embodiment, semiconductor material 303 includes p-type dopants and semiconductor material 305 includes n-type dopants. In one embodiment, an optional insulating region 311 is disposed between semiconductor material regions 303 and 305 to provide a CMOS capacitor type structure. In another embodiment, insulating region 311 is not included to provide a p-n junction type structure. As illustrated in FIG. 3, one embodiment of optical device 301 is fabricated on an SOI wafer and therefore includes a buried insulating layer 307 and a layer of semiconductor material 309. In one embodiment, an optical beam 321 is directed along an optical path through optical waveguide 327. In one embodiment, optical beam 321 includes infrared or near infrared light.

As shown in the embodiment of FIG. 3, semiconductor material region 305 is grounded through contacts 317 and 319 and semiconductor material region 303 is coupled to receive $V_{SIGNAL}$ through contacts 313 and 315. In one embodiment, contacts 313, 315, 317 and 319 are metal contacts that are coupled to semiconductor material regions 303 and 305 at locations outside the optical path of optical beam 321.

In one embodiment, semiconductor material 303 includes higher doped regions 337 and 339 at the respective locations where metal contacts 313 and 315 are coupled to semiconductor material 303. Similarly, semiconductor material 305 includes higher doped regions 337 and 339 at the respective locations where metal contacts 317 and 319 are coupled to semiconductor material 305. In an embodiment in which semiconductor material 303 includes p-type dopants and semiconductor material 305 includes n-type dopants, higher doped regions 337 and 339 are heavily doped with p++ type dopants and higher doped regions 341 and 343 are heavily doped with n++ type dopants. In one embodiment, higher doped regions help improve the electrical coupling of metal contacts 313, 315, 317 and 319 to semiconductor material regions 303 and 305 in accordance with the teachings of the present invention. This improved electrical coupling reduces the contact resistance between metal contacts 313, 315, 317 and 319 and semiconductor material regions 303 and 305, which improves the electrical performance of optical device 301 in accordance with the teachings of the present invention.

The application of $V_{SIGNAL}$ to optical waveguide 327, as shown in FIG. 3, results in the modulation of free charge carriers in charge regions 333, through which optical beam 321 is directed. In one embodiment, a buffer of insulating material 323 and a buffer of insulating material 325 are also included in an optical device 301 in accordance with the teachings of the present invention. As shown in FIG. 3, buffer 323 is disposed between contacts 313 and 317 and the optical path of optical beam 321. Buffer 325 is disposed between contacts 315 and 319 and the optical path of optical beam 321,. In one embodiment, buffers 323 and 325 are made of materials having lower refractive indexes than the refractive index of the core of optical waveguide 327. As a result, buffers 323 and 325 serve as cladding so as to help confine optical beam 321 to remain within optical waveguide 327. In the embodiment illustrated in FIG. 3, buried insulating layer 307 also serves as cladding so as to help confine optical beam 321 to remain within waveguide 327. In one embodiment, buffers 323 and 325 also serve as electrical isolators so as to electrically isolate the contacts coupled to waveguide 327 from the optical electric field guided from optical beam 321.

In one embodiment, a buffer plug 335 of insulating material is also disposed in optical waveguide 327. As shown in the example embodiment of FIG. 1, buffer plug 335 is disposed in optical waveguide 327 on the "top" side, which is the same side as the locations at which metal contacts 313 and 315 are electrically coupled to optical waveguide 137. In one embodiment, buffer plug 335 is made of a material having a lower refractive index than the refractive index of the core of waveguide 327. As a result, buffer plug 335 helps to direct the mode of optical beam 321 away from metal contacts 313 and 315 as well as higher doped regions 337 and 339 in accordance with the teachings of the present invention.

In operation, optical beam 321 is directed through optical waveguide 327 along an optical path through charge regions 333. $V_{SIGNAL}$ is applied to optical waveguide 327 to modulate the free charge carrier concentration in charge regions 333 through which optical beam 321 is directed. The applied voltage from $V_{SIGNAL}$ changes the free charge carrier density in charge regions 333, which results in a change in the refractive index of the semiconductor material in optical waveguide 327. As discussed above, the change in refractive index results in a phase shift of optical beam 321 in response to $V_{SIGNAL}$ in accordance with the teachings of the present invention.

Figure 4:
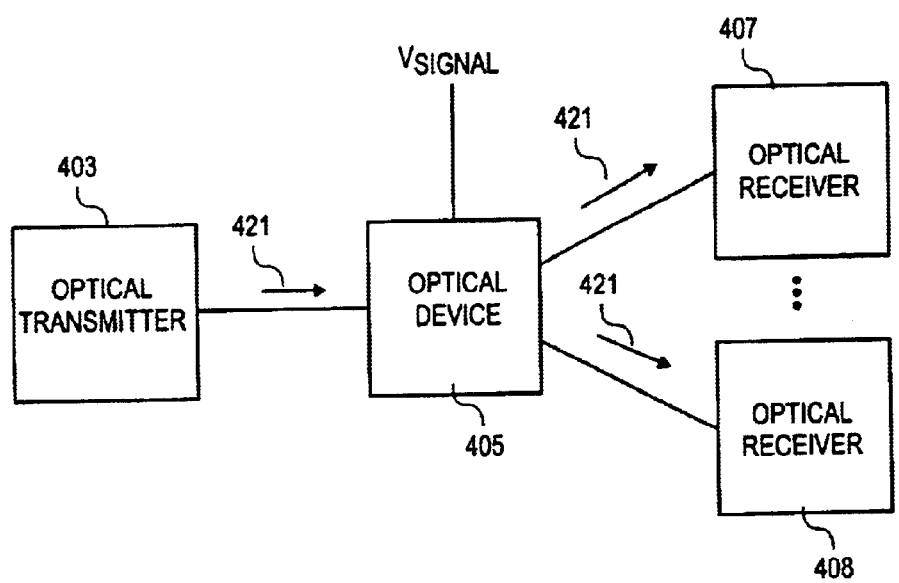
FIG. 4 is a block diagram illustration of one embodiment of a system including an optical transmitter and at least one optical receiver with an optical device including a one embodiment of an optical phase shifter according to embodiments of the present invention.

FIG. 4 illustrates generally a block diagram of one embodiment of a system including an optical transmitter and one or more optical receivers with an optical device according to embodiments of the present invention. In particular, FIG. 4 shows optical system 401 including an optical transmitter 403 and one or more receivers, shown as optical receivers 407 and 408. In one embodiment, optical system 401 also includes an optical device 405 optically coupled between optical transmitter 403 and optical receivers 407 and 408. As shown in FIG. 4, optical transmitter 403 transmits an optical beam 421 that is received by optical device 405. In one embodiment, optical device 405 may include for example a device such as one of the embodiments of the optical devices described above in connection with FIGS. 1–3 to phase shift optical beam 421 in response to signal $V_{SIGNAL}$. In such an embodiment, optical device 405 may serve as an optical delay.

In another embodiment, optical device 405 may include an optical modulator or the like implemented with one or more optical phase shifters according to embodiments of the present invention to modulate optical beam 421. In such an embodiment, optical receiver 407 and optical receiver 408 receive a modulated optical beam 421 that has been modulated by optical device 405 in response to in response to $V_{SIGNAL}$.

In yet another embodiment, optical device 405 may include an M×N optical switch or the like to selectively switch one or more inbound optical beams to one or more outputs. In the embodiment shown in FIG. 4, optical device 405 is illustrated as a 1×2 optical switch in which optical beam 421 received from optical transmitter 421. In one embodiment, optical device selectively switches optical beam 421 to optical receiver 407 or 408 in response to $V_{SIGNAL}$ in accordance with the teachings of the present invention.

Figure 5:
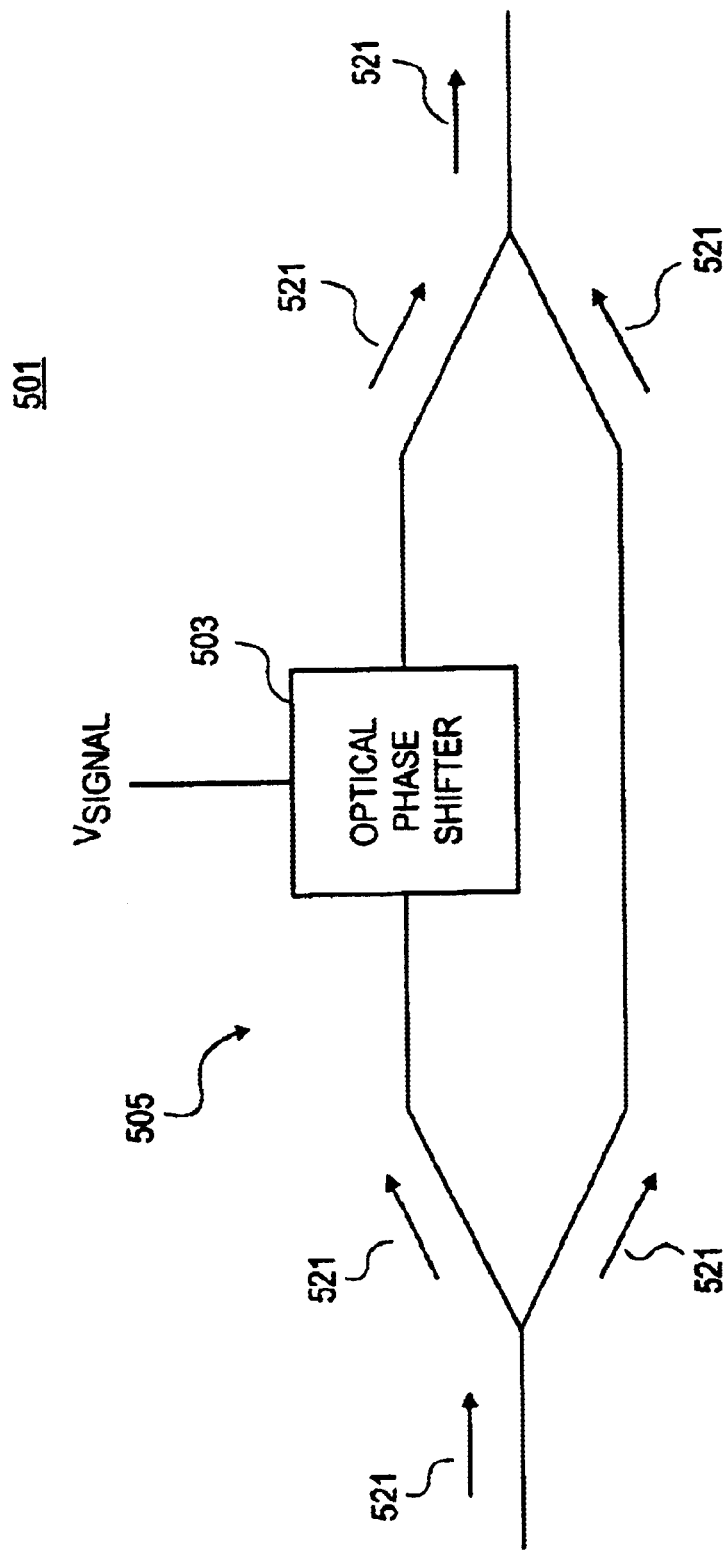
FIG. 5 is a block diagram illustration of one embodiment of an optical modulator including a Mach Zehnder Interferometer (MZI) configuration having one embodiment of an optical phase shifter according to embodiments of the present invention.

FIG. 5 illustrates generally one embodiment of an optical modulator 501 that can be fully integrated in a single integrated package that can be employed for example in place optical device 405 of FIG. 4. As shown in the depicted embodiment, optical modulator 501 includes an optical phase shifter 503 in one of the two arms optically coupled between cascaded Y-branch couplers of a Mach-Zehnder Interferometer (MZI) configuration 505 disposed in semiconductor material. In one embodiment, optical phase shifter 503 is similar to one of the embodiments of the optical devices described above in connection with FIGS. 1–3.

In operation, an optical beam 521 is directed into an input of MZI configuration 505.

Optical beam 521 is split such that a first portion of the optical beam 521 is directed through one of the arms of the MZI configuration 505 and a second portion of optical beam 521 is directed through the other one of the arms of the MZI configuration 505. As shown in the depicted embodiment, at least one of the arms of the MZI configuration 505 includes optical phase shifter 503, which adjusts a relative phase difference between the first and second portions of optical beam 521 in response to signal $V_{SIGNAL}$. In one embodiment, the first and second portions of optical beam 521 are then merged in the semiconductor substrate such that optical beam 521 is modulated at the output of MZI configuration 505 as a result of constructive or destructive interference. In one embodiment, as shown, one of the arms of the MZI configuration 505 includes an optical phase shifter 503. In another embodiment, both of the arms of the MZI configuration 505 may include an optical phase shifter 503 to control the relative phase difference between the first and second portions of optical beam 521.

Figure 6:
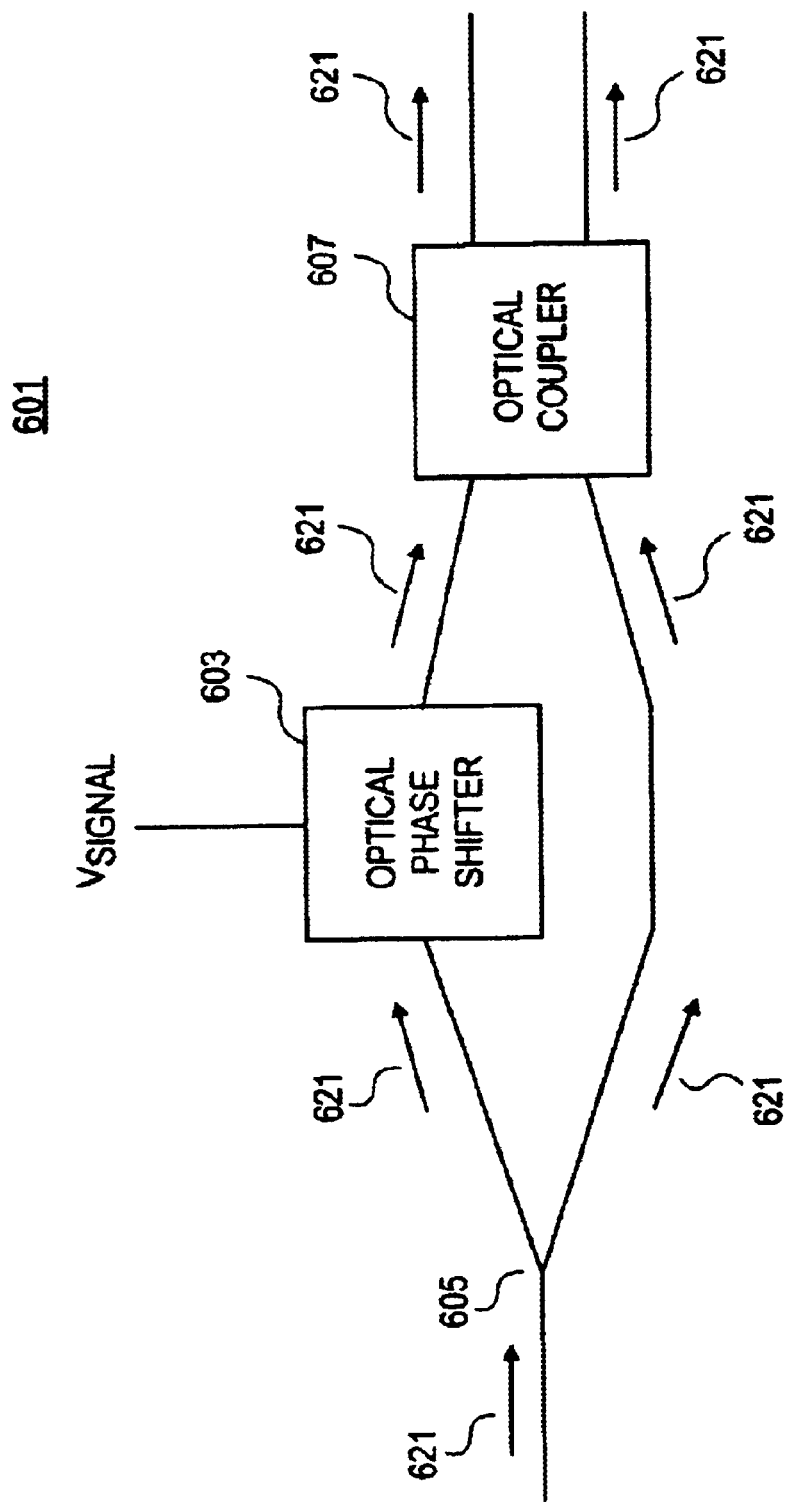
FIG. 6 is a block diagram illustration of one embodiment of a 1×2 optical switch including an optical phase shifter according to embodiments of the present invention.

FIG. 6 shows generally one embodiment of a 1×2 optical switch 601 that can be employed for optical device 405 of FIG. 4. In one embodiment of the present invention, the illustrated semiconductor-based optical switching device may be provided in a fully integrated solution on a single integrated circuit chip. In one embodiment, a 1×2 optical switch is realized with an optical coupler receiving two inbound optical beams have a relative phase difference controlled in response to one or more optical phase shifters in accordance with the teachings of the present invention. As shown in the depicted embodiment, optical switch 601 includes an optical phase shifter 603 optically coupled between an optical splitter 605 and an optical coupler 607. In one embodiment, optical phase shifter 603 is similar to one of the embodiments of optical devices described above in connection with FIGS. 1–3.

In one embodiment, optical splitter 605 may be realized with a Y branch, a multi-mode interference (MMI) device, a 2×2 optical coupler, or the like, and optical coupler 607 may be realized with an MMI device, a 2×2 optical coupler or other suitable optical coupling devices such as for example 3-dB evanescent waveguide couplers or the like. In one embodiment, optical splitter 605 and optical coupler 607 are disposed the same semiconductor material as optical phase shifter 603.

In one embodiment, the input of optical splitter 605 is optically coupled to receive an optical beam 621 through an input waveguide. Optical beam 621 is split and is then portions of optical beam 621 are then output from each of the outputs of optical splitter 605. One of the portions of optical beam 621 is directed through optical phase shifter 603 before it is directed into one of the inputs of optical coupler 607. The other one of the portions of optical beam 609 is directed into the other one of the inputs of optical coupler 607.

In operation, optical phase shifter 603 is used to selectively adjust the relative phase difference between the two portions of optical beam 621 in response to $V_{SIGNAL}$. As a result of the selectable phase difference between the portions of optical beam 621, optical beam 621 may selectively be output from one or the other output of optical coupler 607. In the embodiment depicted in FIG. 6, optical beam 621 may be output from the "bottom" output or from the "top" output of optical coupler 607 based on the relative phase difference between the portions of optical beam 621 resulting from $V_{SIGNAL}$ in accordance with the teachings of the present invention. Accordingly, for example, optical receivers 407 and 408 of FIG. 4 may be optically coupled to the two outputs of optical coupler 607, respectively.

Figure 7:
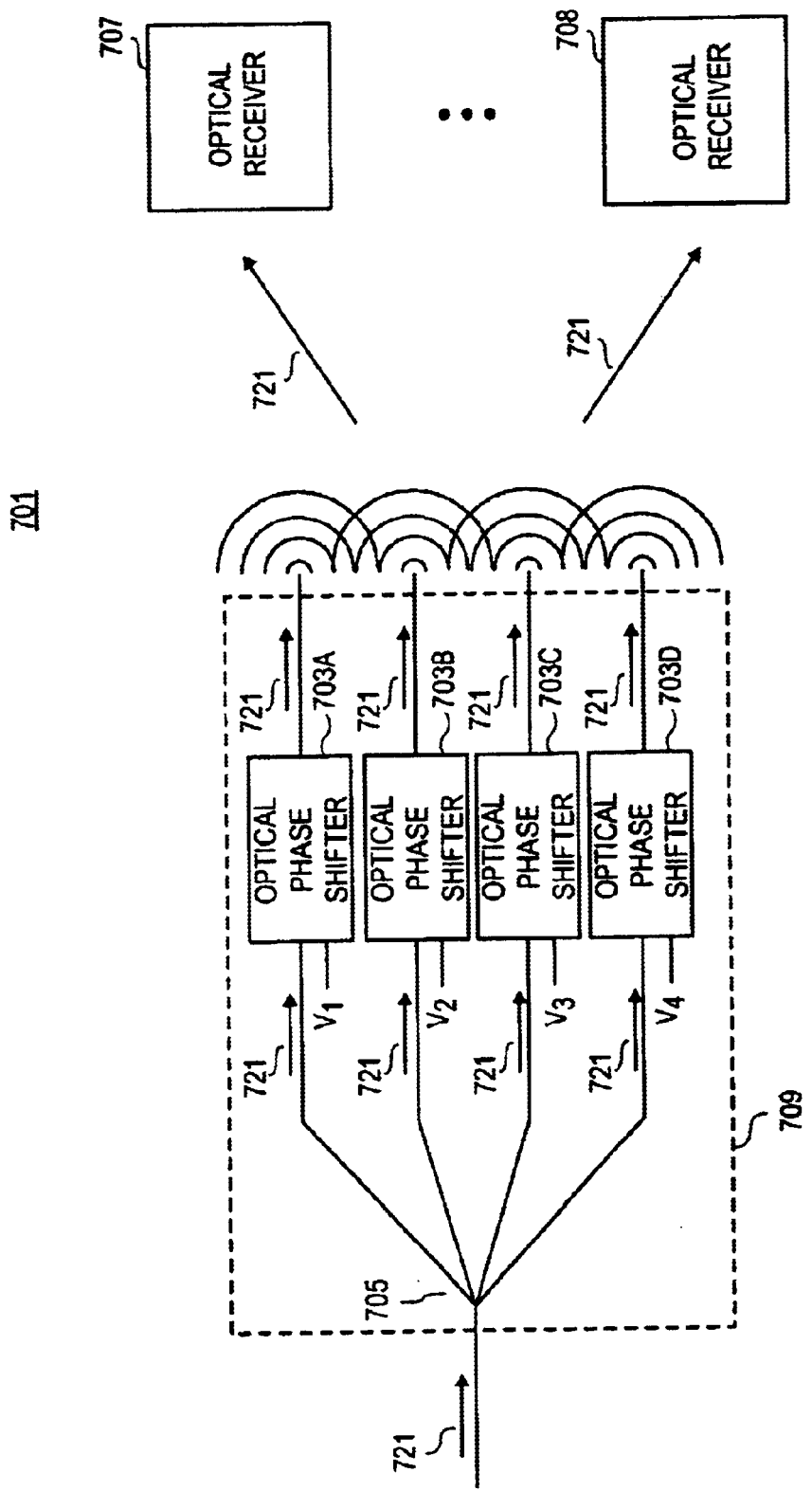
FIG. 7 is a block diagram illustration of one embodiment of a 1×N optical switch including a plurality of optical phase shifters according to embodiments of the present invention.

FIG. 7 shows generally one embodiment of a 1×N optical switch 701 that can be employed for optical device 405 of FIG. 4. In one embodiment of the present invention, the illustrated semiconductor-based optical switching device may be provided in a fully integrated solution on a single integrated circuit chip. In one embodiment, a 1×N optical switch is realized with an optical splitter and a plurality of optical phase shifters, similar for example to one of the embodiments of optical devices described above in connection with FIGS. 1–3. Each of the plurality of phase shifters is coupled to control relative phase differences between portions of an optical beam in accordance with the teachings of the present invention. A interference pattern resulting from the wavefronts of the optical beam propagating from the plurality of phase shifters may be controlled such that the optical beam is received at a selected one of the N outputs of optical switch 701.

To illustrate, FIG. 7 shows 1×N optical switch 701 including an optical splitter 705 included in semiconductor material 709. As shown in the illustrated embodiment, optical splitter 705 receives optical beam 721 and splits optical beam 721 into a plurality of optical beams 721. For illustration purposes, FIG. 7 shows optical splitter 705 splitting optical beam 721 into N=4 portions. It is appreciated that although N=4 in the embodiment shown in FIG. 7, N may be a larger or a smaller number in accordance with the teachings of the present invention. In one embodiment, a network of Y branches, or a 1×4 MMI device, or another suitable optical splitter structure may be employed to implement optical splitter 705 to split optical beam 721.

As shown in the illustrated embodiment, a plurality of optical phase shifters 703A, 703B, 703C and 703D are included in semiconductor material 709. Each of the plurality of optical phase shifters 703A, 703B, 703C and 703D are coupled to receive a respective one of the portions of optical beam 721. In one embodiment, optical phase shifters 703A, 703B, 703C and 703D may be implemented for example by devices such as for example one of the embodiments of the optical devices described above in connection with FIGS. 1–3. In one embodiment, optical phase shifters 703A, 703B, 703C and 703D are coupled to receive signals $V_1$, $V_2$, $V_3$ and $V_4$, respectively, to control the relative phase differences between the respective portions of optical beam 721 propagating through optical phase shifters 703A, 703B, 703C and 703D.

In one embodiment, after the portions of optical beam 721 are directed through optical phase shifters 703A, 703B, 703C and 703D, the portions of the optical beam 721 are then recombined as illustrated in FIG. 7. As a result of the relative phase differences between the portions of optical beam 721 output from optical phase shifters 703A, 703B, 703C and 703D, the interference pattern resulting from the wavefronts of the portions of optical beam 721 propagating away from the plurality of optical phase shifters 703 A, 703 B, 703C and 703D may be controlled to selectively "illuminate" the desired output. In particular, optical beam 721 is selectively directed to a selected one of a plurality of outputs, such as for example optical receiver 707 or 708 in accordance with the teachings of the present invention. Thus, in one embodiment, signals $V_1$, $V_2$, $V_3$ and $V_4$ are controlled to adjust the interference pattern directed from optical phase shifters 703A, 703B, 703C and 703D to selectively direct optical beam 721 to optical receiver 707 or 708 in accordance with the teachings of the present invention.

Figure 8:
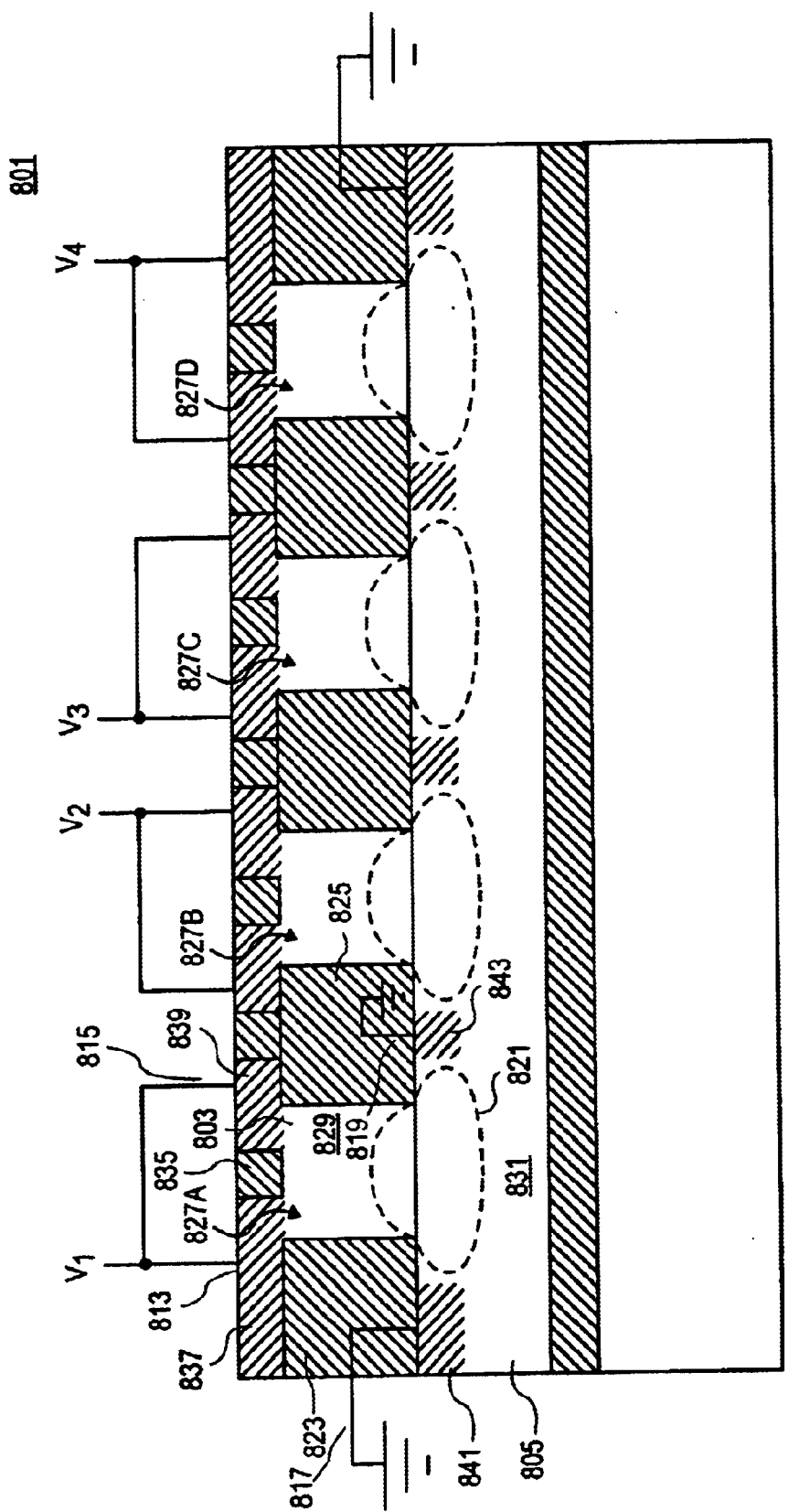
FIG. 8 is a cross-section illustration of one embodiment of a 1×N optical switch including a plurality of optical phase shifters, each including a buffer of insulating material disposed between a contact and an optical path as well as a buffer plug to help direct a mode of an optical beam away from the contact in accordance with the teachings of the present invention.

FIG. 8 is a cross-section illustrating generally one embodiment of an optical device 801 including a plurality of phase shifters disposed in or on the same semiconductor material in accordance with the teachings of the present invention. It is appreciated that the optical device 801 illustrated in FIG. 8 may represent one embodiment of a cross-section illustration optical phase shifters 703A, 703B, 703C and 703D of FIG. 7.

In particular, FIG. 8 shows that optical device 801 including four optical waveguides 827A, 827B, 827C and 827D. In the illustrated embodiment, optical waveguides 827A, 827B, 827C and 827D are separately coupled to receive signals $V_1$, $V_2$, $V_3$ and $V_4$, respectively to adjust a phase of a respective optical beam. It is appreciated that optical waveguides 827A, 827B, 827C and 827D may correspond to optical phase shifters 703A, 703B, 703C and 703D, respectively, of FIG. 7. In one embodiment, each of the optical waveguides 827A, 827B, 827C and 827C are similar to each other and to optical waveguide 127 of FIG. 1. To illustrate, optical waveguide. 827A is described.

As shown in FIG. 8, optical waveguide 827A includes a rib portion 829 in a first region of semiconductor material 803 having a first conductivity type and a slab portion 831 in a second region of semiconductor material 805 having a second conductivity type, through which an optical beam 821 is directed. Signal $V_1$ is coupled to the first region of semiconductor material 803 through metal contact 813 and higher doped region 837, and through metal contact 815 and higher doped region 839. The second region of region of semiconductor material 805 is grounded through metal contact 817 and higher doped region 841 and through metal contact 819 and higher doped region 843.

In the illustrated embodiment, buffer of insulating material 823 is disposed between the location metal contact 813 and the optical path of optical beam 821. Similarly, buffer of insulating material 825 is disposed between the location metal contact 815 and the optical path of optical beam 821. Buffer plug of insulating material is also disposed in optical waveguide 827. As shown in the example embodiment of FIG. 8, buffer plug 835 is disposed in optical waveguide. 827 on the "top" side, which is the same side as the locations at which metal contacts 813 and 815 are electrically coupled to optical waveguide 827. In one embodiment, buffer plug 835 is made of a material having a lower refractive index than the refractive index of the core of wave guide 827. As a result, buffer plug 835 helps to direct the mode of optical beam 821 away from metal contacts 813 and 815 as well as higher doped regions 837 and 839 in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a first region of an optical waveguide disposed in semiconductor material, the first region having a first conductivity type;
   a second region of the optical waveguide disposed in the semiconductor material, the second region having a second conductivity type opposite to the first conductivity type;
   a first contact coupled to the optical waveguide at a first location outside an optical path of an optical beam to be directed through the optical waveguide;
   a first buffer of insulating material disposed along the optical waveguide between the first contact and the optical path of the optical beam; and
   a buffer plug of insulating material disposed in the optical waveguide on a same side as the first location, the buffer plug to help direct a mode of the optical beam away from the first location.

2. The apparatus of claim 1 wherein the first region of the optical waveguide includes a first higher doped region coupled to the first contact at the first location to improve an electrical coupling between the first contact and the optical waveguide, the buffer plug to further help direct the mode of the optical beam away from the first higher doped region.

3. The apparatus of claim 1 further comprising:
   a second contact coupled to the optical waveguide at a second location outside the optical path of the optical beam, the buffer plug to further help direct the mode of the optical beam away from the second location; and
   a second buffer of insulating material disposed along the optical waveguide between the second contact and the optical path of the optical beam.

4. The apparatus of claim 3 wherein the first region of the optical waveguide includes a second higher doped, region coupled to the second contact at the second location to improve an electrical coupling between the second contact and the optical waveguide, the buffer plug to further help direct the mode of the optical beam away from the second higher doped region.

5. The apparatus of claim 3 wherein the first and second buffers of insulating material are laterally disposed along sidewalls of the optical waveguide to serve as cladding so as to help confine the optical beam within the optical waveguide.

6. The apparatus of claim 5 wherein the first and second buffers of insulating material are adapted to serve as electrical isolators to isolate first and second contacts from the optical path of the optical beams.

7. The apparatus of claim 1 wherein the optical waveguide comprises a rib waveguide, wherein the first region comprises a rib portion of the optical waveguide and the second region comprises a slab portion of the optical waveguide.

8. The apparatus of claim 1 wherein the optical waveguide comprises a strip waveguide.

9. The apparatus of claim 1 further comprising a third contact coupled to the second region of the optical waveguide at a third location outside the optical path of the optical waveguide, wherein the first buffer of insulating material is disposed between the third contact and the optical path of the optical beam.

10. The apparatus of claim 3 further comprising a fourth contact coupled to the second region of the optical waveguide at a fourth location outside the optical path of the optical waveguide, wherein the second buffer of insulating material is disposed between the fourth contact and the optical path of the optical beam.

11. The apparatus of claim 1 wherein a charge concentration in the optical waveguide is coupled to be modulated in response to a signal coupled to be received by the first contact.

12. The apparatus of claim 1 further comprising:
    an insulating region disposed between the first and second regions of the optical waveguide; and
    a charge modulated region to be modulated along the optical path of the optical beam and proximate to the insulating region between the first and second regions of the optical waveguide, the charge modulated region to modulate a phase of the optical beam to be directed through the optical waveguide.

13. A method, comprising:
    directing an optical beam along an optical path through an optical waveguide disposed in semiconductor material;
    applying an electrical signal to a first contact coupled the optical waveguide at a first location;
    isolating the first contact from the optical path through which the optical beam is directed with a first buffer of insulating material disposed along the optical waveguide between the first contact and the optical path of the optical beam; and
    directing the optical beam away from the first contact with a buffer plug of insulating material disposed in the optical waveguide on a same side of the optical waveguide as a side of the optical waveguide to which the first contact is coupled.

14. The method of claim 13 further comprising:
    improving an electrical coupling between the first contact and the optical waveguide with a first higher doped region of semiconductor material included in the optical waveguide and coupled to the first contact; and
    directing the optical beam away from the first higher doped region of semiconductor material with the buffer plug of insulating material disposed in the optical waveguide.

15. The method of claim 13 further comprising:
    applying the electrical signal to a second contact coupled the optical waveguide at a second location; and
    isolating the second contact from the optical path through which the optical beam is directed with a second buffer of insulating material disposed along the optical waveguide between the second contact and the optical path of the optical beam.

16. The method of claim 15 further comprising:
    improving an electrical coupling between the second contact and the optical waveguide with a second higher doped region of semiconductor material included in the optical waveguide and coupled to the second first contact; and
    directing the optical beam away from the second higher doped region of semiconductor material with the buffer plug of insulating material disposed in the optical waveguide.

17. The method of claim 13 further comprising modulating in response to the electrical signal a charge concentration along the optical path through the optical waveguide through which the optical beam is directed to phase shift the optical beam in response to the electrical signal.

18. A system, comprising:
   an optical transmitter to generate an optical beam;
   an optical receiver optically coupled to receive the optical beam;
   an optical device optically coupled between the optical transmitter and the optical receiver, the optical device including an optical phase shifter to modulate a phase of the optical beam, the optical phase shifter including:
      a first region of an optical waveguide disposed in semiconductor material, the first region having a first conductivity type;
      a second region of the optical waveguide disposed in the semiconductor material, the first region having a second conductivity type opposite to the first conductivity type;
      a first contact coupled to the optical waveguide at a first location outside an optical path of an optical beam to be directed through the optical waveguide;
      a first buffer of insulating material disposed along the optical waveguide between the first contact and the optical path of the optical beam;
      a buffer plug of insulating material disposed in the optical waveguide on a same side as the first location, the buffer plug to help direct a mode of the optical beam away from the first location.

19. The system of claim 18 wherein the first region of the optical waveguide includes a first higher doped region coupled to the first contact at the first location to improve an electrical coupling between the first contact and the optical waveguide, the buffer plug to further help direct the mode of the optical beam away from the first higher doped region.

20. The system of claim 18 wherein the optical devices further comprises:
   a second contact coupled to the optical waveguide at a second location outside the optical path of the optical beam, the buffer plug to further help direct the mode of the optical beam away from the second location; and
   a second buffer of insulating material disposed along the optical waveguide between the second contact and the optical path of the optical beam.

21. The system of claim 20 wherein the first region of the optical waveguide includes a second higher doped region coupled to the second contact at the second location to improve an electrical coupling between the second contact and the optical waveguide, the buffer plug to further help direct the mode of the optical beam away from the second higher doped region.

22. The system of claim 18 wherein the a charge concentration in the semiconductor material along the optical path of the optical waveguide of the phase shifter is adapted to be modulated in response to a signal coupled to be received by the first contract to modulate a phase of the optical beam to be directed through the optical waveguide.

23. The system of claim 18 wherein the optical phase shifter is included in an optical modulator to selectively modulate the optical beam.

24. The system of claim 18 wherein the optical phase shifter is included in an optical switch to selectively switch the optical beam from an input of the optical switch to one of a plurality of outputs of the optical switch.

25. An apparatus, comprising:
   an optical splitter disposed in semiconductor material, the optical splitter to split an optical beam to be directed through the optical splitter into a plurality of portions of the optical beam; and
   a plurality of optical phase shifters disposed in the semiconductor material, each of the plurality of optical phase shifters optically coupled the optical splitter to receive a respective one of the plurality of portions of the optical beam, the plurality of optical phase shifters adapted to adjust relative phase differences between the plurality of portions of the optical beams to control an interference resulting from the plurality of portions of the optical beams when recombined, each of the plurality of optical phase shifters including:
      a first region of an optical waveguide disposed in the semiconductor material, the first region having a first conductivity type;
      a second region of the optical waveguide disposed in the semiconductor material, the second region having a second conductivity type opposite to the first conductivity type;
      a first contact coupled to the optical waveguide at a first location outside an optical path of a respective portion of the optical beam to be directed through the optical waveguide;
      a first buffer of insulating material disposed along the optical waveguide between the first contact and the optical path of the respective portion of the optical beam; and
      a buffer plug of insulating material disposed in the optical waveguide on a same side as the first location, the buffer plug to help direct a mode of the respective portion of the optical beam away from the first location.

26. The apparatus of claim 25 wherein the fist region of the optical waveguide includes a first higher doped region coupled to the first contact at the first location to improve an electrical coupling between the first contact and the optical waveguide, the buffer plug to further help direct the mode of the respective portion of the optical beam away from the first higher doped region.

27. The apparatus of claim 25 further comprising:
   a second contact coupled to the optical waveguide at a second location outside the optical path of the respective portion of the optical beam, the buffer plug to further help direct the mode of the respective portion of the optical beam away from the second location; and
   a second buffer of insulating material disposed along the optical waveguide between the second contact and the optical path of the respective portion of the optical beam.

28. The apparatus of claim 27 wherein the first region of the optical waveguide includes a second higher doped region coupled to the second contact at the second location to improve an electrical coupling between the second contact and the optical waveguide, the buffer plug to further help direct the mode of the respective portion of the optical beam away from the second higher doped region.

29. The apparatus of claim 25 wherein the apparatus is an optical switch adapted to control the interference resulting from the plurality of portions of the optical beams when recombined to selectively switch the optical beam to be received by one of a plurality of optical receivers in response to a signal received by at least one of the plurality of optical phase shifters.

30. The apparatus of claim 25 wherein the apparatus is an optical modulator adapted to control the interference resulting from the plurality of portions of the optical beams when recombined to modulate the optical beam in response to a signal received by at least one of the plurality of optical phase shifters.

* * * * *